United States Patent
Chang

(10) Patent No.: US 7,279,634 B1
(45) Date of Patent: Oct. 9, 2007

(54) WIRE STRUCTURE OF A POWER SUPPLY

(75) Inventor: Hsing-Ting Chang, Taipei Hsien (TW)

(73) Assignee: Andyson International Co., Ltd., Taipei Hsien (TW)

( * ) Notice: Subject to any disclaimer, the term of this patent is extended or adjusted under 35 U.S.C. 154(b) by 0 days.

(21) Appl. No.: 11/414,235

(22) Filed: May 1, 2006

(51) Int. Cl.
*H01J 5/00* (2006.01)

(52) U.S. Cl. .................................. 174/50.5; 174/50.2

(58) Field of Classification Search .............. 174/50.5, 174/50.52, 50.6, 51, 36; 361/826, 827
See application file for complete search history.

(56) References Cited

U.S. PATENT DOCUMENTS

| | | | |
|---|---|---|---|
| 5,578,876 A * | 11/1996 | Crampton | 307/80 |
| 6,283,789 B1 * | 9/2001 | Tsai | 439/502 |
| 6,935,902 B1 * | 8/2005 | Chou | 439/701 |
| 7,014,509 B2 * | 3/2006 | Devine et al. | 439/638 |
| 2004/0252468 A1 * | 12/2004 | Chang | 361/752 |
| 2005/0041389 A1 * | 2/2005 | Martin et al. | 361/685 |
| 2005/0078467 A1 * | 4/2005 | Barr et al. | 361/816 |
| 2005/0146850 A1 * | 7/2005 | Meir | 361/687 |
| 2005/0237724 A1 * | 10/2005 | Fiorentino et al. | 361/752 |
| 2006/0044754 A1 * | 3/2006 | Hung | 361/687 |

* cited by examiner

*Primary Examiner*—William H. Mayo, III
(74) *Attorney, Agent, or Firm*—Birch, Stewart, Kolasch & Birch, LLP

(57) ABSTRACT

A wire structure for a power supply. It includes a power supply having a casing on which a wire structure is transfixed out for outputting the power source. The wire structure is composed of a cluster of connection wires, a motherboard power cord, and at least one power cord set. The cluster of connection wires is provided with a plurality of connection seats for connecting with the power cord set, and the other end of the power cord set is provided with a power connector corresponding to future expanded equipments and elements for various different specifications.

3 Claims, 7 Drawing Sheets

WIRE STRUCTURE OF A POWER SUPPLY

BACKGROUND OF THE INVENTION (a) Field of the Invention

The present invention is related to a wire structure of a power supply, and more particularly to a wire structure of an output of a power supply, which provides a cluster of connection wires and a plurality of power cord sets having power connectors corresponding to various expanded equipments with different specifications.

(b) Description of the Prior Art

The computer is very popular so that most homes and companies use computers. A central processing unit (CPU), Motherboard, any kinds of slots, interface cards (such as display card and audio card and so on), hard disk, floppy disk and CD-ROM disk are emplaced within the case of the computer. However, without a power supply the computer cannot operate.

Referring to FIG. 1, the traditional power supply A of the computer includes a casing A1, and an interior installed with a power circuit A2 for transforming and regulating the voltage. A bundle of power cord sets A3, including a plurality of several power cord sets A3, extends from the power circuit A2 toward an exterior of the casing A1. The tail end of each power cord set A3 is provided with one or multiple power connectors A4 corresponding to future expanded equipments and elements of different specifications. The power connectors used with current specification a4 include one 24PIN power connector A41 connected to the motherboard, one peripheral power connector 4PIN power connector A42 connected to the ordinary hard disk and CD-ROM disk, one floppy drive power connector 15 PIN power connector A43 connected to the floppy disk, and a serial ATA power connector 15 PIN power connector A44 used by an SATA hard disk. In addition, there may be possible requirements of power connectors A45 for other specifications for future expansion equipment.

Observing the traditional design of the aforementioned power supply, a set of plural power cord sets are installed together, and their quantities and specifications of power connectors are already fixed. With future developments, changes in computer technology and a growing increment of personal demand, such a design and construction of the power supply with wire structure/accessory elements will be sufficient and therefore will be easily phased out. It also forces the user to replace or give up the power supply altogether sense an expansion is not available. It will result in the waste of existing resources.

Furthermore, in order to cope with an increment of expansion equipment, an intricate and complicated layout may be formed in an interior of the computer casing by transfixing the power cord set from a same place, which is hard to arrange and may even cause insufficient heat dissipation inside the computer casing. In the above situation, when the user is using the conventional power supply, he or she may be confronted with the aforementioned two problems. Therefore, there is new type of power supply, which is provided with an expandable power cord set in the market.

Referring to FIG. 2, an interior of casing A1 is shown with the power supply A installed with the power circuit A2 for transforming and regulating voltage. The termination of the power supply A is provided with the plurality of female junctions A5, the motherboard power cords A6, and the plurality of power cord sets A7. The end of a single power cord set A7 is connected with the male junction A71 inserted into the corresponding female junction A5, the other end of A7 is connected with the power connector A72. The A7 can be designed as the type which can be connected to the plurality of power connectors A72. Accordingly, A7 can be used to provide the power to the plurality of different expansion equipment.

In a practical usage, the male junction A71 of A7 is inserted into anyone female junction A5 of the power supply A for accessing power. Then the power connector A72 at the other end of A7 is connected with the expansion equipment. This design is rather convenient in use and does not form an intricate wiring inside the computer casing, and also provides a great assistance for a future expandability. However, the process of the additional manufacturing of the female junctions is very complicated and the other circuit-board to be manufactured results in high cost and the possibility of short circuits.

(C) SUMMARY OF THE INVENTION

The primary object of present invention is to provide the improvement with a wire structure in the output of a power supply which is simple to be manufactured and with expandability, and can prevent the difficulty in arrangement due to too many cord sets.

Accordingly, the present invention comprises a power supply, for which a casing is provided with a power circuit for transforming and regulating the voltage of the computer. An opening on the casing is transfixed with a wire structure for outputting the power source. The wire structure is composed of "cluster of connection wires", "motherboard power cord" and at least one "power cord set". A tail end of the cluster of connection wires is connected with the plurality of connection seats, and the motherboard power cord is connected into the corresponding socket on the motherboard. At the end of the power cord set, the connector is inserted into the connection seat, and the other end of power cord set is connected with at least one power connector corresponding to expansion equipment for different specifications.

According to the aforementioned structures, the cluster of connection wires is directly formed by extending the power circuit of the power supply, and hence does not require an additional design of corresponding circuit board or other complicated circuits. It allows simple manufacturing and a reduction of time for allocation processing. During the assembling for use, the connector at one end of the power cord set will insert into the connection seat of the cluster of connection wires to supply the provide power. Then the power connector of the other end of the power cord set can connect to the different expansion equipments. The number of power connectors can be adjusted according to the practical requirement and even the power cord set can be flexibly and easily replaced by a different type.

Accordingly, the present invention is provided with a good expandability, and can easily cope with change about the interface specification for future expansion equipment. Moreover, the power cord set of the present invention can provide the plurality of power connectors for different specifications, which will eliminate the concern about the problem under insufficiency of the power connectors, and can simplify an over-mixed wiring layout to the conventional power supply in order to prevent the influence of the computer's function.

To enable a better understanding of the said objectives and the technological methods of the invention herein, one clear sample will be described by illustration about the embodiments and arrangement characteristics.

DETAILED DESCRIPTION OF THE PREFERRED EMBODIMENTS

Figure 1:
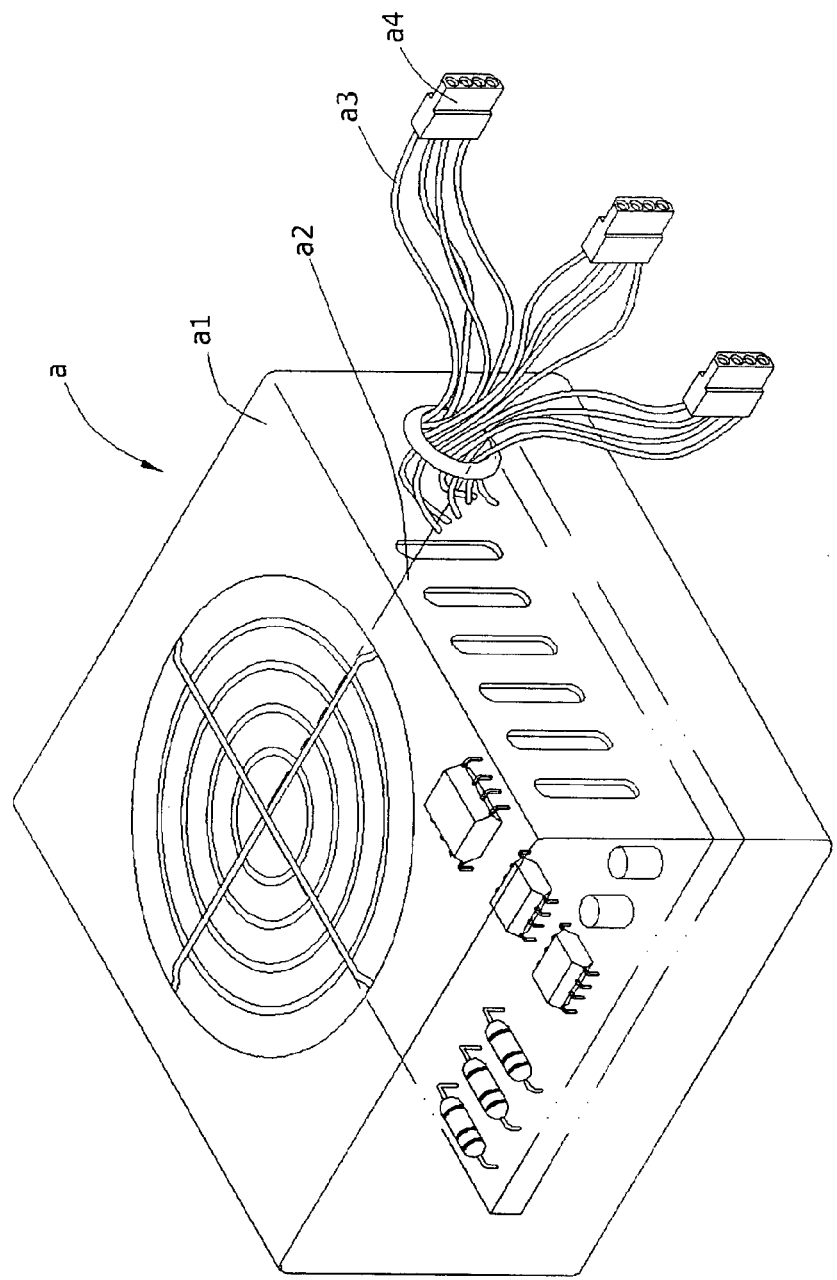
FIG. 1 shows a perspective view of a conventional power supply.
Figure 2:
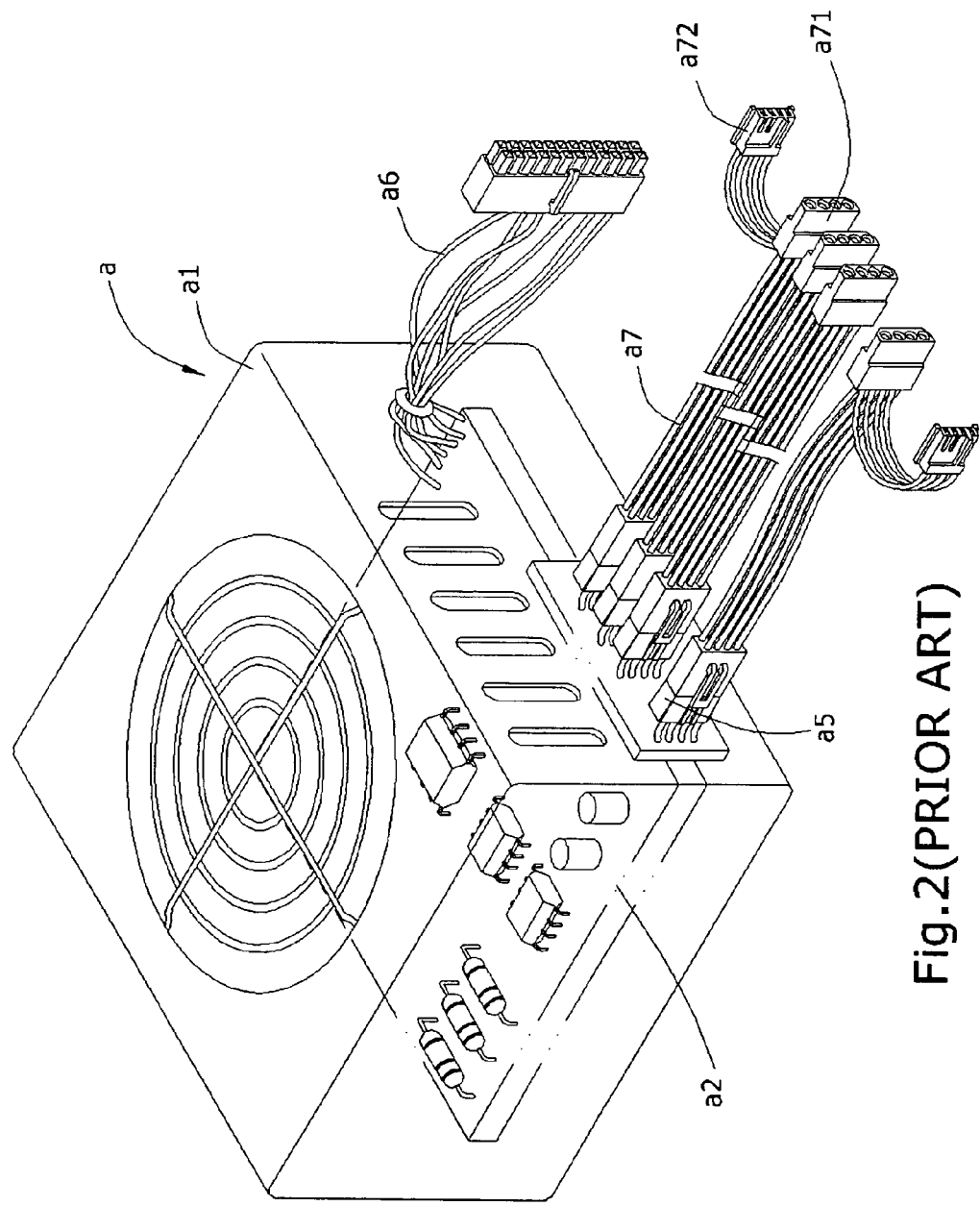
FIG. 2 shows a perspective view of another conventional power supply.
Figure 3:
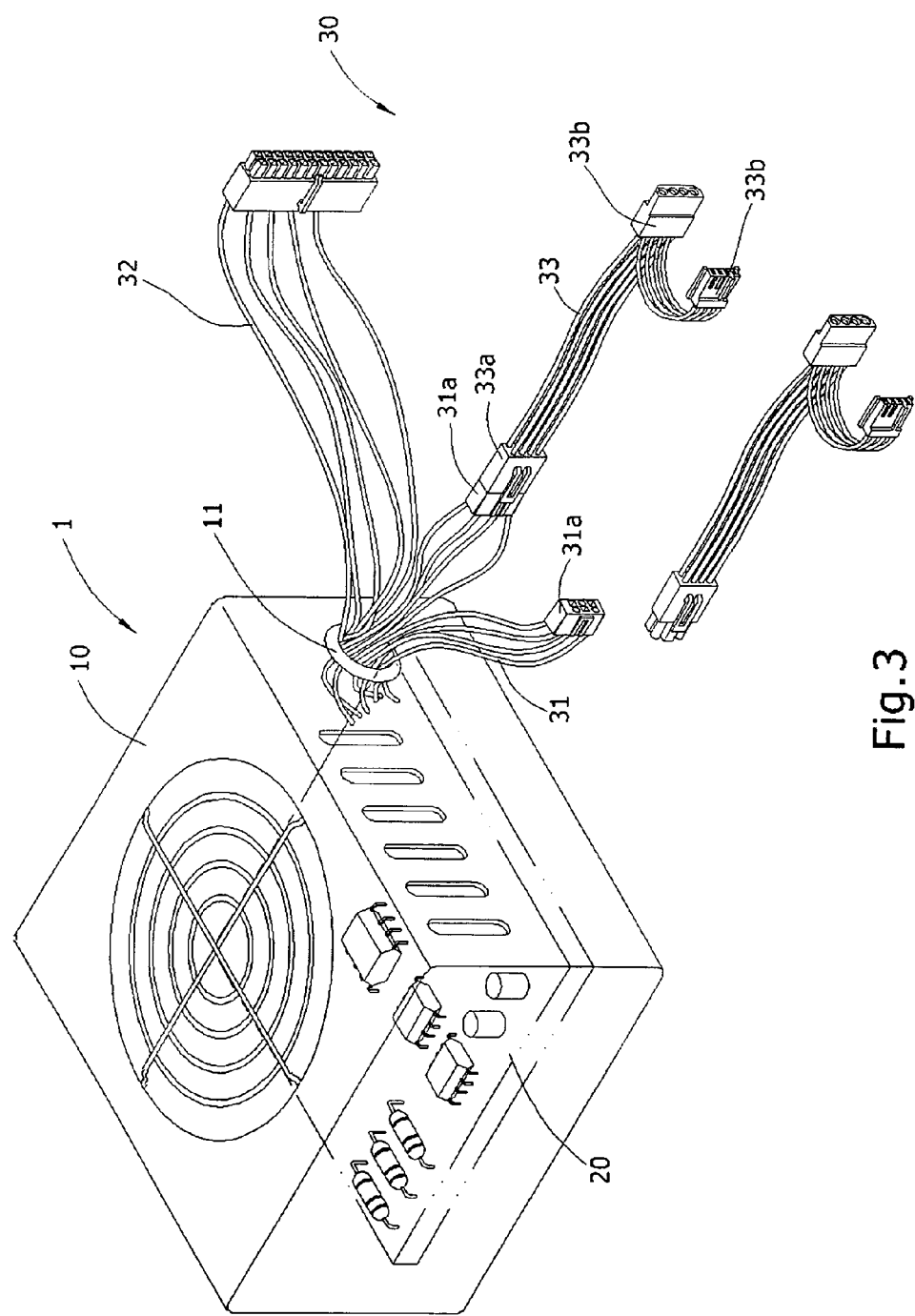
FIG. 3 shows an exploded view of the present invention.
Figure 4:
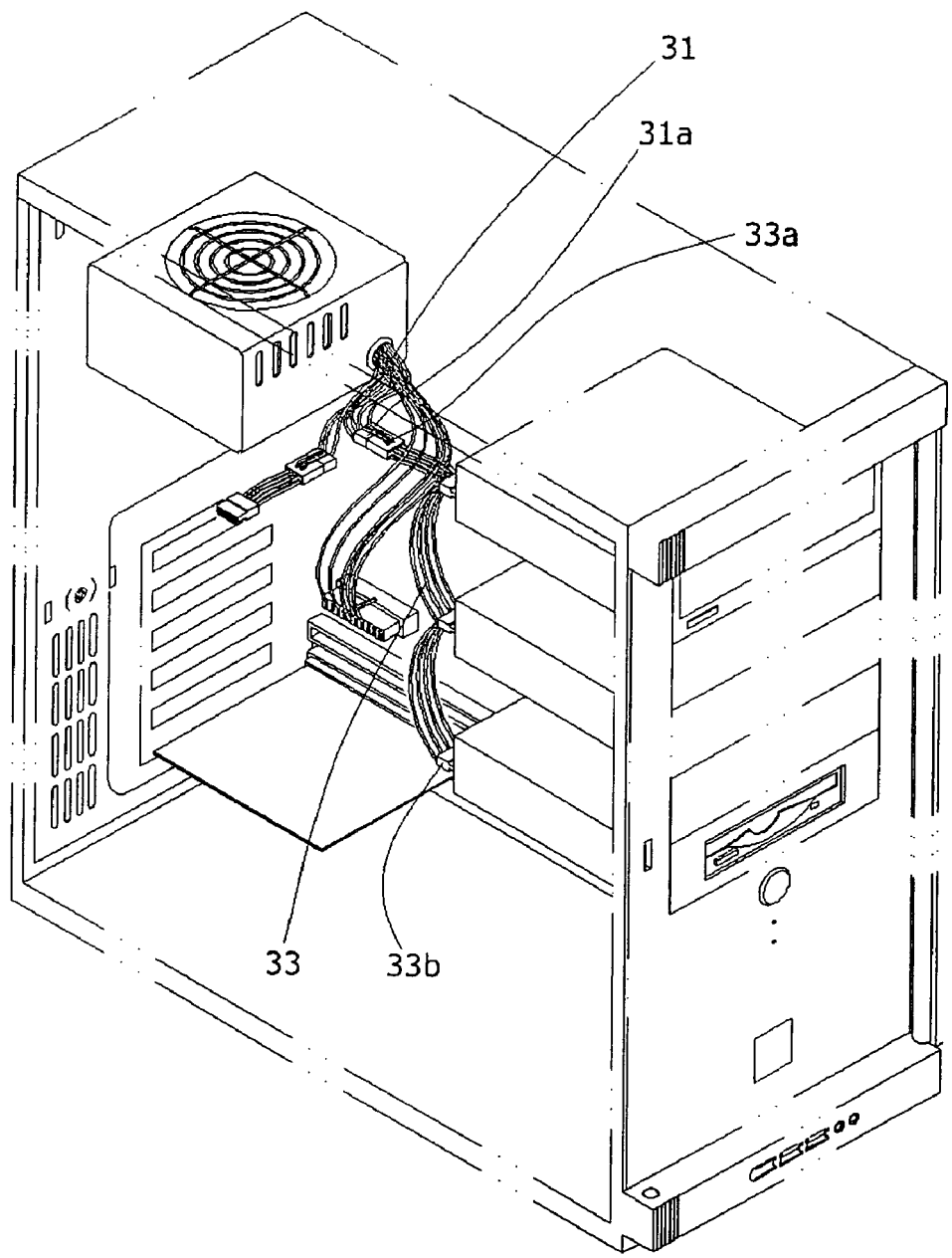
FIG. 4 shows a schematic view of the present invention connected with expansion equipment.
Figure 5:
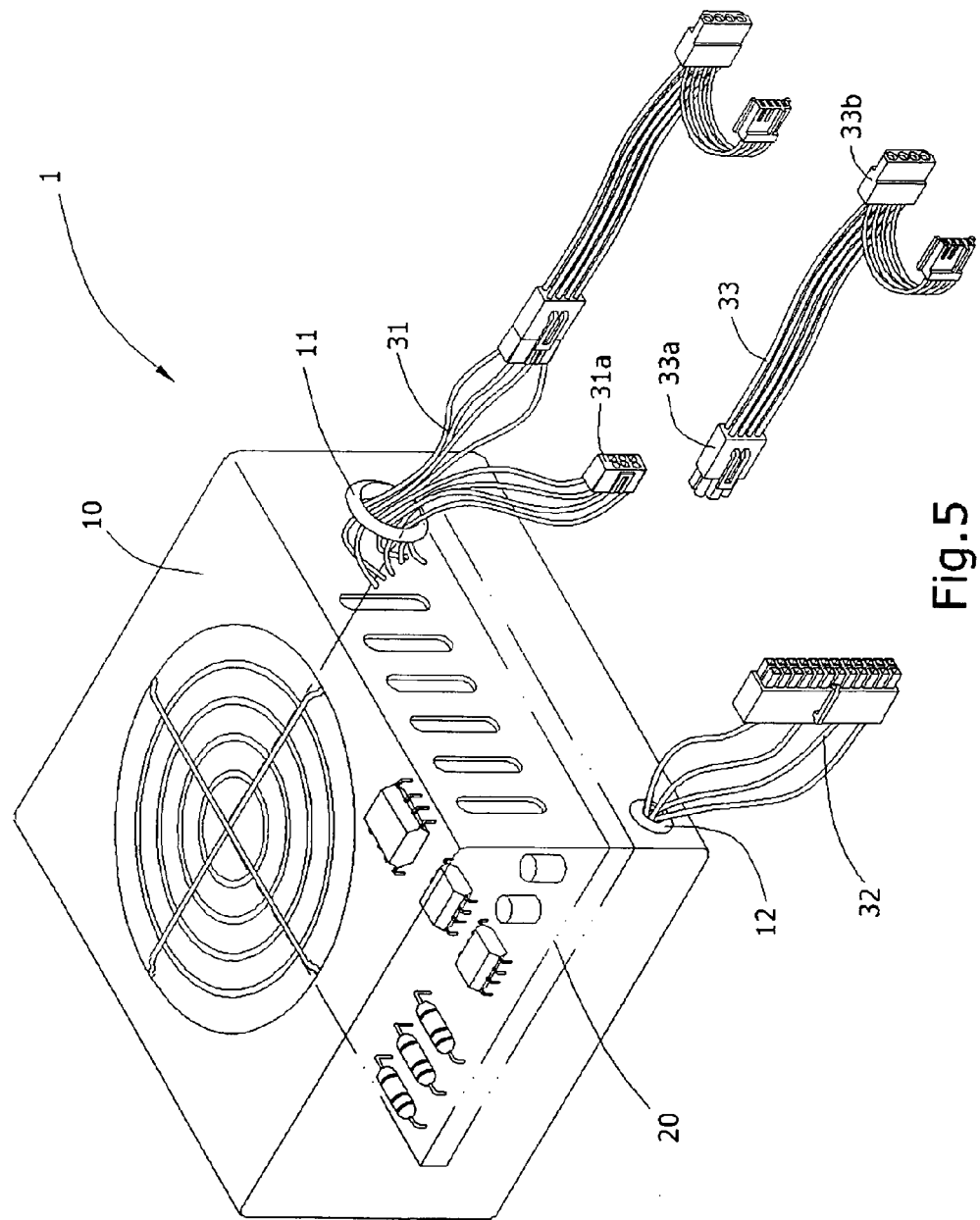
FIG. 5 shows a perspective view of another embodiment of the present invention.

Referring to FIG. 3, FIG. 4 and FIG. 5, the interior of the power supply casing 10 is provided with a power circuit 20 for transforming and regulating the input/output voltage, and the wire structure 30 for the output of power source is transfixed out from an opening 11 on the casing 10. The wire structure 30 is composed of a "cluster of connection wires 31", "motherboard power cord 32", and at least one "power cord set 33". The tail end of the cluster of connection wires 31 is connected with the plurality of connection seats 31a. The motherboard power cord 32 is connected into a corresponding socket on the motherboard. It is transfixed out of the same opening 11 along with the aforementioned cluster of connection wires 31, or is independently transfixed out of an opening 12 (FIG. 7) located closely to the motherboard socket to improve the shortcoming of an additional wiring to the motherboard. One end of the power cord set 33 with a connector 33a is inserted into the connection seat 31a, whereas the other end is connected with at least one power connector 33b corresponding to expanded equipment of different interface specification.

When assembling for use, the connector 33a of the single power cord set 33 is inserted into the connection seat 31a of the cluster of connection wires 31a to access the power resource, and then, the power connector 33b of the power cord set 33 is connected to any kinds of different expanded equipment to provide the power requirement.

Figure 6:
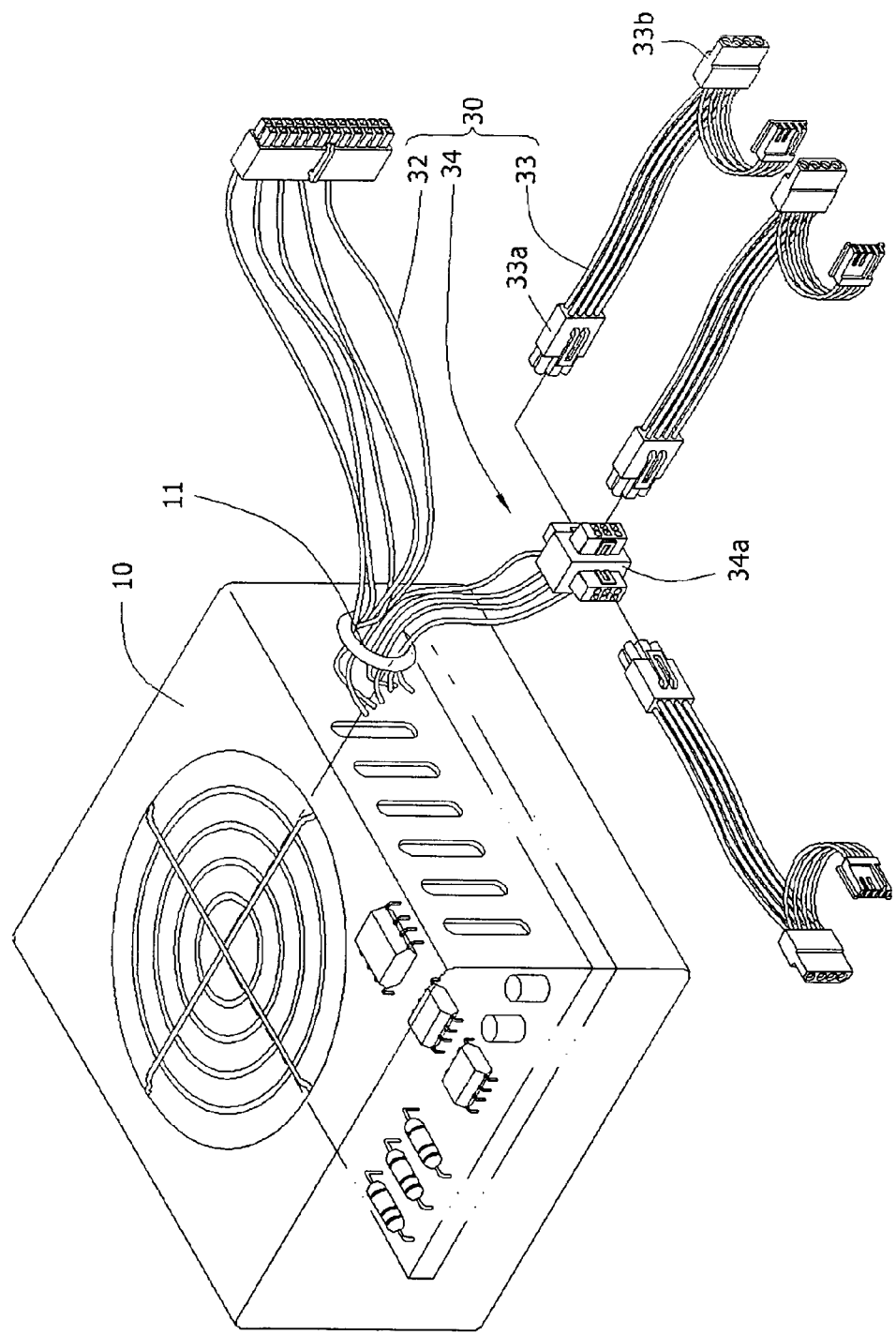
FIG. 6 a perspective view of a third embodiment of the present invention.
Figure 7:
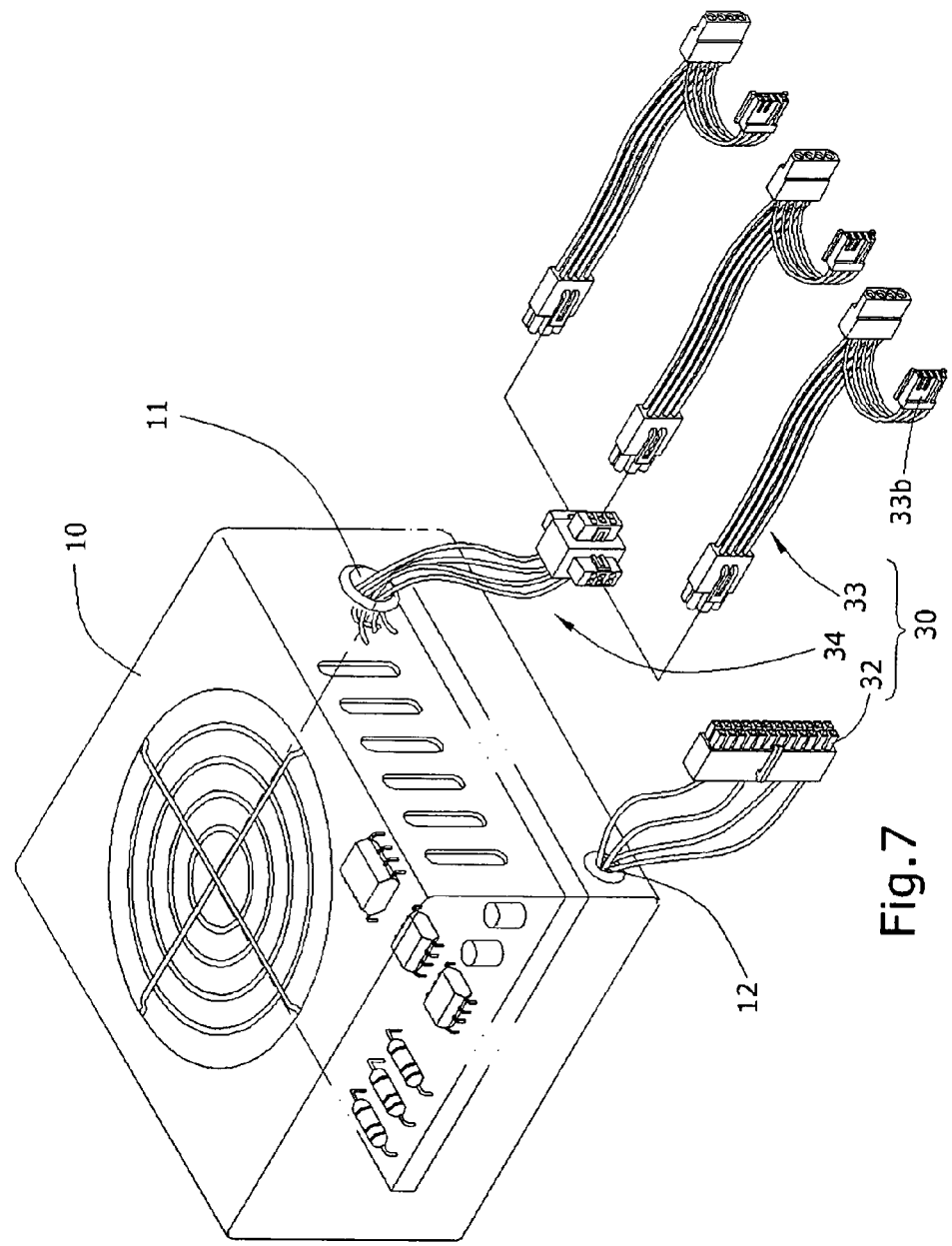
FIG. 7 shows a perspective view of a fourth embodiment of the present invention.

Referring to FIG. 6 and FIG. 7 the wire structure 30 for the output of power source is transfixed out from an opening 11 of a casing 10. The wire structure 30 is primarily composed of "multi-connection wire 34", "motherboard power cord 32", and at least one "power cord set 33", The tail end of the multi-connection wire 34 is connected with the multi-connection seat 34a for connecting a plurality of power cord sets. The motherboard power cord 32 is connected into a corresponding socket on the motherboard. It is transfixed out of the same opening 11 along with the aforementioned multi-connection wire 34, or is independently transfixed out of an opening 12 located closely to the motherboard socket to improve the shortcoming of an additional wiring to the motherboard. One end of the power cord set 33 with a connector 33a is inserted into the multi-connection seat 34a, whereas the other end of the power cord set 33 is connected with at least one power connector 33b corresponding to expanded equipment of different interface specification.

Accordingly, the wire structure of a power supply of present invention uses a cluster of connection wires to connect with an expandable power cord set, which is simple to manufacture and is able to reduce a time for processing, thereby being provided with a good expandability, and being able to prevent the problem of difficulty in arrangement due to too many cord sets existing.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A wire structure of the power supply, said power supply having a casing with a power circuit provided in the interior of the casing for transforming and regulating a voltage, said wire structure comprising:
   a cluster of connection wires;
   a motherboard power cord;
   at least one power cord set;
   the wire structure being transfixed out of an opening on the casing;
   a tail end of the cluster of connection wires being connected with a plurality of connection seats;
   the motherboard power cord being connected into a socket on the motherboard;
   an end of the power cord set being a connector inserted into one of said plurality of connection seats, the other end of the power cord set being connected with at least one power connector for expanded equipment.

2. The wire structure of a power supply according to claim 1, wherein the motherboard power cord is independently transfixed out of another opening located closely to the motherboard socket.

3. A wire structure of the power supply, said power supply having a casing with a power circuit provided in the interior of the casing for transforming and regulating a voltage, said wire structure comprising:
   a multi-connection wire;
   a motherboard power cord;
   at least one power cord set;
   the wire structure being transfixed out of an opening on the casing;
   a tail end of the multi-connection being connected with multi-connection seat;
   the motherboard power cord being connected into a socket on the motherboard;
   an end of the power cord set being a connector inserted into the multi-connection seat, the other end of the power cord set being connected with at least one power connector for expanded equipment.

* * * * *